(12) United States Patent
Zhu et al.

(10) Patent No.: US 9,290,387 B2
(45) Date of Patent: Mar. 22, 2016

(54) PREPARATION OF ARRAYS OF LONG CARBON NANOTUBES USING CATALYST STRUCTURE

(75) Inventors: Yuntian T. Zhu, Cary, NC (US); Paul Arendt, Los Alamos, NM (US); Qingwen Li, Los Alamos, NM (US); Xiefie Zhang, Chattanooga, TN (US)

(73) Assignee: Los Alamos National Security, LLC, Los Alamos, NM (US)

( * ) Notice: Subject to any disclaimer, the term of this patent is extended or adjusted under 35 U.S.C. 154(b) by 1531 days.

(21) Appl. No.: 11/897,072

(22) Filed: Aug. 28, 2007

(65) Prior Publication Data

US 2009/0136751 A1  May 28, 2009

Related U.S. Application Data

(60) Provisional application No. 60/841,324, filed on Aug. 31, 2006.

(51) Int. Cl.

| | | |
|---|---|---|
| *H01B 1/12* | (2006.01) | |
| *D01F 9/12* | (2006.01) | |
| *D02G 3/02* | (2006.01) | |
| *B01J 21/06* | (2006.01) | |
| *B01J 21/10* | (2006.01) | |
| *B01J 21/04* | (2006.01) | |
| *B01J 23/00* | (2006.01) | |
| *B01J 23/755* | (2006.01) | |
| *B01J 23/745* | (2006.01) | |
| *B01J 23/75* | (2006.01) | |
| *C01B 31/02* | (2006.01) | |

(Continued)

(52) U.S. Cl.
CPC ............. *C01B 31/0233* (2013.01); *B82Y 30/00* (2013.01); *B82Y 40/00* (2013.01); *D01F 9/12* (2013.01); *C01B 2202/08* (2013.01); *C01B 2202/34* (2013.01); *Y10T 428/2918* (2015.01)

(58) Field of Classification Search
USPC ................... 423/447.1, 447.2, 447.3, 445 B; 977/742–754, 842–484
See application file for complete search history.

(56) References Cited

U.S. PATENT DOCUMENTS

| 6,495,258 B1 | 12/2002 | Chen et al. |
| 6,682,677 B2 | 1/2004 | Lobovsky et al. |

(Continued)

FOREIGN PATENT DOCUMENTS

| WO | WO 2006/073460 | * | 7/2006 | ............. B01D 53/02 |

OTHER PUBLICATIONS

Hata, et al., Water-Assisted Highly Efficient Synthesis of Impurity-Free Single-Walled Carbon Nanotubes, Science 2004; 306: 1362-1364.*

(Continued)

*Primary Examiner* — Daniel C McCracken
(74) *Attorney, Agent, or Firm* — Lewis Roca Rothgerber Christie LLP

(57) ABSTRACT

A structure for preparing an substantially aligned array of carbon nanotubes include a substrate having a first side and a second side, a buffer layer on the first side of the substrate, a catalyst on the buffer layer, and a plurality of channels through the structure for allowing a gaseous carbon source to enter the substrate at the second side and flow through the structure to the catalyst. After preparing the array, a fiber of carbon nanotubes may be spun from the array. Prior to spinning, the array can be immersed in a polymer solution. After spinning, the polymer can be cured.

19 Claims, 3 Drawing Sheets

(51) Int. Cl.
B82Y 30/00 (2011.01)
B82Y 40/00 (2011.01)

(56) References Cited

U.S. PATENT DOCUMENTS

2004/0101685 A1 5/2004 Fan et al.
2005/0132949 A1 6/2005 Kang et al.
2005/0170089 A1* 8/2005 Lashmore et al. ......... 427/248.1
2007/0237959 A1* 10/2007 Lemaire ....................... 428/408

OTHER PUBLICATIONS

Zhang, et al., Multifunctional Carbon Nanotube Yarns by Downsizing an Ancient Technology, Science 2004; 306: 1358-1361.*
Definition of "channel," entry 6, accessed online at http://dictionary.reference.com/browse/channel?s=t on Sep. 29, 2013.*
Hata, et al., Water-Assisted Highly Efficient Synthesis of Impurity-Free Single-Walled Carbon Nanotubes, Science 2004; 1362-1364.*
de los Arcos, et al., Strong influence of buffer layer type on carbon nanotube characteristics, Carbon 2004; 42: 187-190.*
Definition of Porosity accessed at https://en.wikipedia.org/wiki/Porosity on Jun. 29, 2015.*
Chen et al., "Structures with High Number Density of Carbon Nanotubes and 3-Dimensional Distribution," U.S. Pat. No. 6,495,258 B1, Issued Dec. 17, 2002.
Kang et al., "Forming Carbon Nanotubes by Iterating Nanotube Growth and Post-Treatment Steps," US 2005/0132949 A1, published Jun. 23, 2005.
Fan et al., "Isotope-Doped Carbon Nanotube and Method and Apparatus for Forming the Same," US 2004/0101685 A1, published May 27, 2004.
Zhu, "Preparation of Fibers From a Supported Array of Nanotubes," WO 2006/073460, published Jul. 13, 2006.
Kelly et al., "Concise Encyclopedia of Composite Materials," Pergamon, Oxford, UK, 1995, pp. 42, 50 and 94.
Haggenmueller et al., "Aligned Single-Wall Carbon Nanotubes in Composites by Melt Processing Methods," Chemical Physics Letters, vol. 330, Nov. 2000, pp. 219-225.
Zhang et al., " Rapid Growth of Well-Aligned Carbon Nanotube Arrays," Chemical Physics Letters, vol. 362, Aug. 2002, pp. 285-290.
Jiang et al., "Spinning Continuous Carbon Nanotube Yarns," Nature, vol. 419, Oct. 2002, p. 801.
Cadek et al., "Morphological and Mechanical Properties of Carbon-Nanotube-Reinforced Semicrystalline and Amorphous Polymer Composites," Applied Physics Letters, vol. 81, Dec. 2002, pp. 5123-5125.
Demczyk et al., "Direct Mechanical Measurement of the Tensile Strength and Elastic Modulus of Multiwalled Carbon Nanotubes," Materials Science and Engineering, A334, Sep. 2002, pp. 173-178.
Maruyama et al., "Low-Temperature Synthesis of High-Purity Single-Walled Carbon Nanotubes from Alcohol," Chemical Physics Letters, vol. 360, Jul. 2002, pp. 229-234.
Safadi et al., "Multiwalled Carbon Nanotube Polymer Composites: Synthesis and Characterization of Thin Films," Journal of Applied Polymer Science, vol. 84, Jun. 2002, pp. 2660-2669.
Liao et al., "Effect of Catalyst Composition on Carbon Nanotube Growth," Appl. Phys. Lett., vol. 82, Apr. 2003, pp. 2694.
Dalton et al., "Super-Tough Carbon-Nanotube Fibers," Nature, vol. 423, Jun. 2003, p. 703.
Coleman et al., "Improving the Mechanical Properties of Single-Walled Carbon Nanotube Sheets by Intercalation of Polymeric Adhesives," Applied Physics Letters, vol. 82, Mar. 2003, pp. 1682-1684.
Penumadu et al., "Mechanical Properties of Blended Single-Wall Carbon Nanotube Composites," Materials Research Society, vol. 18, Aug. 2003, pp. 1849-1853.
Li et al., "Direct Spinning of Carbon Nanotube Fibers from Chemical Vapor Deposition Synthesis," Science, vol. 304, Apr. 2004, pp. 276-278.
Ericson et al., Macroscopic, Neat, Single-Walled Carbon Nanotube Fibers, Science, vol. 305, Sep. 2004, pp. 1447-1450.
Hata et al., "Water-Assisted Highly Efficient Synthesis of Impurity-Free Single-Walled Carbon Nanotubes," Science, vol. 306, Nov. 2004, pp. 1362-1364.
Zheng et al., "Ultrlong Single-Wall Carbon Nanotubes," Nature Materials, vol. 3, 2004), pp. 673.
Zhang et al., "Multifunctional Carbon Nanotube Yarns by Downsizing an Ancient Technology," Science, vol. 306, (2004) pp. 1358-1361.

* cited by examiner

PREPARATION OF ARRAYS OF LONG CARBON NANOTUBES USING CATALYST STRUCTURE

RELATED APPLICATIONS

This application claims the benefit of U.S. Provisional Patent Application Ser. No. 60/841,324 entitled PREPARATION OF ARRAYS OF LONG CARBON NANOTUBES USING CATALYST STRUCTURE filed Aug. 31, 2006, hereby incorporated by reference.

STATEMENT REGARDING FEDERAL RIGHTS

This invention was made with government support under Contract No. DE-AC52-06NA25396 awarded by the U.S. Department of Energy. The government has certain rights in the invention.

FIELD OF THE INVENTION

The present invention relates generally to arrays of carbon nanotubes, and more particularly to a catalyst structure having channels and to the preparation of an array of carbon nanotubes on the catalyst structure, and to spinning fibers of carbon nanotubes from the array.

BACKGROUND OF THE INVENTION

Individual carbon nanotubes (CNTs) are at least one order of magnitude stronger than any other known material. CNTs with perfect atomic structures have a theoretical strength of about 300 GPa. In practice carbon nanotubes do not have perfect structures. However, CNTs that have been prepared have a measured strength of up to about 150 GPa, and the strength may improve upon annealing. For comparison, Kevlar fibers currently used in bullet-proof vests have a strength of only about 3 GPa, and carbon fibers used for making space shuttles and other aerospace structures have strengths of only about 2-5 GPa.

Currently, CNTs prepared according to present methods are far too short to make effective use of their strength and/or cannot be prepared in sufficiently large quantities. A method for synthesizing 40-millimeter long individual carbon nanotubes on silicon substrates, for example, has been reported (see: Zheng et al., Nature Materials, vol. 3, (2004) pp. 673). While the method is useful for preparing CNTs for electronics and sensor applications, it is not useful for preparing CNTs for making structural components because the CNTs cannot easily be removed from the silicon substrate, and the method can't be used to produce CNTs in large enough quantities.

Presently, CNT fibers can be drawn from CNT-polymer solutions or directly from CNT arrays. However, due to practical difficulties in dispersing, assembling and aligning carbon nanotubes using a CNT-polymer route, a strategy based on direct spinning of fibers from CNT arrays is more attractive.

The spinnability of CNT arrays depends greatly on the quality of the arrays, including CNT alignment, density, purity, length, and other factors. Due to difficulties in growing long CNT arrays that are conducive to spinning, CNT yarns so far can only be drawn from arrays of less than 1 mm long, and have a tensile strength lower than 3.3 Pa.

Suitable catalysts are important for synthesizing arrays of long CNTs. Hata et al. for example, prepared such a catalyst and used the catalyst to synthesize an array of long nanotubes (see: Hata et al., Science, (2004), vol. 306, pp. 1362-1364, incorporated by reference). According to Hata et al., the array was synthesized by a water assisted chemical vapor deposition (CVD) procedure using ethylene as a carbon source and a catalyst prepared by sputtering a thin layer of iron on a buffer layer of aluminum oxide. The aluminum oxide layer was previously deposited on the silicon dioxide surface layer of a silicon substrate. This catalyst is typically abbreviated as $SiO_2/Al_2O_3$(10 nm)/Fe(1 nm), where the positions of the layers in the abbreviation indicate that the aluminum oxide layer is in between the silica layer and the iron layer. Using this catalyst, other researchers have prepared arrays of multi-walled CNTs with CNTs that are less than 2.2 mm in length. Arrays of long multi-walled CNTs can also be obtained using a catalyst structure having a buffer layer of MgO (instead of $Al_2O_3$).

There have been efforts to prepare long CNT arrays in the hope CNT fibers with high strength could be spun from these arrays. The longest CNT array (i.e. the CNT array with the longest carbon nanotubes) reported thus far is with CNTs of a length of only 4.0 mm (see: Yun et al., J. Phys. Chem. B, vol. 110, (2006), pp. 23920-23925, incorporated by reference), which is shorter than what will be needed to spin CNT fibers with high strength.

Another problem with known preparations of CNT arrays is the use of a large amount of hydrogen gas in the precursor. Presently, it appears that a feed gas that includes hydrogen in an amount greater than 20 percent and as high as 50 percent hydrogen is required for the growth of long CNT arrays. Hydrogen is relatively expensive and can be dangerous when large amounts are used in the laboratory and industrially. Importantly, CNT arrays of the prior art are generally not good precursors for fibers because they tend to be contaminated with amorphous carbon.

There remains a need for better catalysts, better methods of preparing long CNT arrays, and longer fibers of CNTs with improved strength.

SUMMARY OF THE INVENTION

In accordance with the purposes of the present invention, as embodied and broadly described herein, the present invention is concerned with a structure that includes a substrate having a first side and a second side, a buffer layer on the first side of the substrate, a catalyst on the buffer layer, and a plurality of channels through the structure for allowing a gaseous carbon source to enter the substrate at the second side and flow through the structure to the catalyst.

The invention also includes a system for preparing an array of carbon nanotubes. The system includes a structure, the structure including a substrate having a first side and a second side; a buffer layer on the first side of the substrate; a catalyst on the buffer layer, and a plurality of channels through the structure for allowing a gaseous carbon source to enter the substrate at the second side and flow through the structure to the metal catalyst particles. The system also includes a conduit large enough to surround said structure and configured such that gas flowing through said conduit contacts said second side of said structure before contacting said first side of said structure. The system also includes a delivery system that sends said gaseous carbon source through said conduit to said structure.

The present invention also includes a method for preparing an array of carbon nanotubes. The method involves exposing a structure to a gaseous carbon nanotube precursor for a duration within a temperature range chosen to minimize the formation of amorphous carbon, wherein the structure comprises a substrate having a first side and a second side, a buffer layer on the first side of the substrate, a catalyst on the buffer layer, and channels that permit the flow of the gaseous carbon nanotube precursor into the second side and through the structure to the catalyst, whereby an array of substantially aligned carbon nanotubes having an average length of greater than 0.5 millimeter forms on the structure.

The present invention also includes a supported array of carbon nanotubes prepared by a method that involves exposing a structure to a gaseous carbon nanotube precursor for a duration within a temperature range chosen to minimize the formation of amorphous carbon, wherein the structure comprises a substrate having a first side and a second side, a buffer layer on the first side of the substrate, a catalyst on the buffer layer, and channels that permit the flow of the gaseous carbon nanotube precursor into the second side and through the structure to the catalyst, whereby an array of substantially aligned carbon nanotubes having an average length of greater than 0.5 millimeter forms on the structure.

The invention also includes a method for preparing a fiber that involves exposing a structure to a gaseous carbon nanotube precursor for a duration within a temperature range chosen to minimize the formation of amorphous carbon, wherein the structure comprises a substrate having a first side and a second side, a buffer layer on the first side of the substrate, a catalyst on the buffer layer, and channels that permit the flow of the gaseous carbon nanotube precursor into the second side and through the structure to the catalyst, whereby an array of substantially aligned carbon nanotubes having an average length of greater than 0.5 millimeter forms on the structure; and spinning a fiber from the array.

The invention also includes a fiber prepared by exposing a structure to a gaseous carbon nanotube precursor for a chosen amount of time within a chosen temperature range, wherein the structure comprises a substrate having a first side and a second side, a buffer layer on the first side of the substrate, a catalyst on the buffer layer, and channels that permit the flow of the gaseous carbon nanotube precursor into the second side and through the structure to the catalyst, whereby an array of substantially aligned carbon nanotubes having an average length of greater than 0.5 millimeter forms on the structure; and spinning a fiber from the array.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

The invention is concerned with the preparation of arrays of long carbon nanotubes (CNTs). According to the present invention, arrays of long (greater than 0.5 millimeters) CNTs are synthesized using a catalyst structure and a carbon source under conditions where carbon from the carbon source decomposes to form carbon nanotubes. The invention is also concerned with fibers that are spun from the array.

Figure 1:
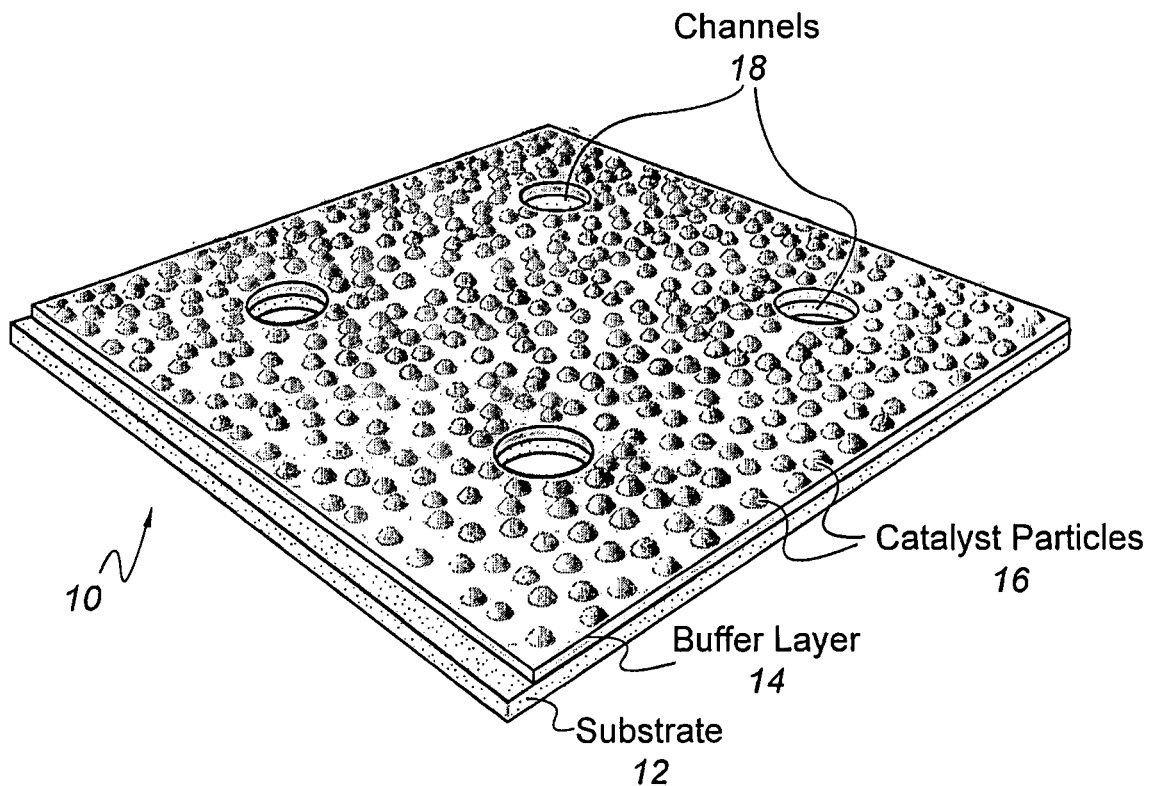
FIG. 1 is a schematic illustration of an embodiment structure for preparation of long carbon nanotube arrays. The structure includes a substrate, a buffer layer on the substrate, catalyst particles on the buffer layer and channels that permit the flow of a gaseous carbon nanotube precursor through the structure.

In an embodiment, a catalyst structure is prepared by (i) depositing a buffer layer on a Si substrate having channels, (ii) depositing a catalyst film on the buffer layer, and (iii) and forming catalyst particles from the catalyst film on the buffer layer. The resulting catalyst structure is exposed to a carbon source under conditions that result in the production of an array of long CNTs on the catalyst structure. FIG. 1 is a schematic illustration of an embodiment catalyst structure 10 that includes a silicon substrate 12, a buffer layer 14 on silicon substrate 12, catalyst particles 16 on buffer layer 14, and channels 18 that permit the flow of a gaseous mixture of hydrocarbon and inert gas from one side of the catalyst structure to the other.

Figure 2:
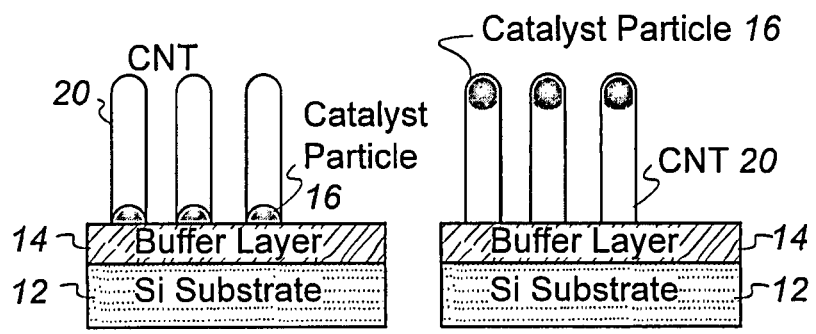
FIG. 2 shows base growth and tip growth of carbon nanotubes from a catalyst surface.

Catalytic particles 16 may be located at the growing tips of nanotubes (CNTs) 20 (tip growth) or at their bases (base growth) (see FIG. 2). During tip growth, catalyst particles 16 move with the growing nanotube tips, and may experience changes in both temperature and hydrocarbon gas flux, especially when the synthesis chamber is small. A variation in temperature or hydrocarbon gas flux may lead to deactivation of the catalyst particle. It is desirable to have base growth, in which catalyst particles 16 remain on the substrate and nanotubes 20 grow from them. Results indicate that when $Al_2O_3$ is used as a buffer layer, carbon nanotubes 20 grow by base growth, wherein catalyst particles 16 remain stationary on the buffer layer and their temperature stays constant. In some cases, a smaller amount of catalyst has been observed within the arrays and near the tips of the CNTs. In any case, the hydrocarbon must diffuse through the growing nanotube array to the catalyst so that it may react with the catalyst for nanotube growth.

When hydrocarbon gas reacts with catalyst particles, carbon atoms for nanotube growth are released from the hydrocarbon gas. For base growth, hydrocarbon gas must diffuse through the growing nanotube array in order to reach the catalyst. Diffusion is an intrinsically slow process and becomes even slower as the nanotube array grows taller. This slows down the nanotube growth, and also eventually limits how long nanotubes from the array can become, and is believed to be an important factor that currently limits the growth of CNT arrays to heights of only a few millimeters.

An aspect of the invention is concerned with overcoming a diffusion problem that currently limits the length of CNTs formed in an array. The problem relates to supplying a carbon source (hydrocarbon gas, for example) to the vicinity of catalyst particles after a somewhat long CNT array has formed on the substrate. According to the invention, a substrate with channels is used, and gaseous carbon source from the backside of the substrate through the channels to catalyst particles on the buffer layer. A schematic representation of the channeled substrate is shown in FIG. 1.

The channels may be generally distributed in any manner about or though the substrate. Preferably, the channels are uniformly distributed in the substrate. The channels are generally created before the buffer layer is deposited on the substrate.

In some preferred embodiments, the channels are about 0.5-1.0 millimeters (mm) in diameter and about 2-4 mm apart because hydrocarbon vapor can diffuse through a 2.5-mm tall nanotube array with these dimensions for the channels and spacings between the channels. However, it should be understood that other channel sizes and spacings will also work and that the invention should not be limited to these exact measurements. Substrates with such channels are easily fabricated by, for example, laser machining or by chemical etching through a photolithographic mask.

Figure 3:
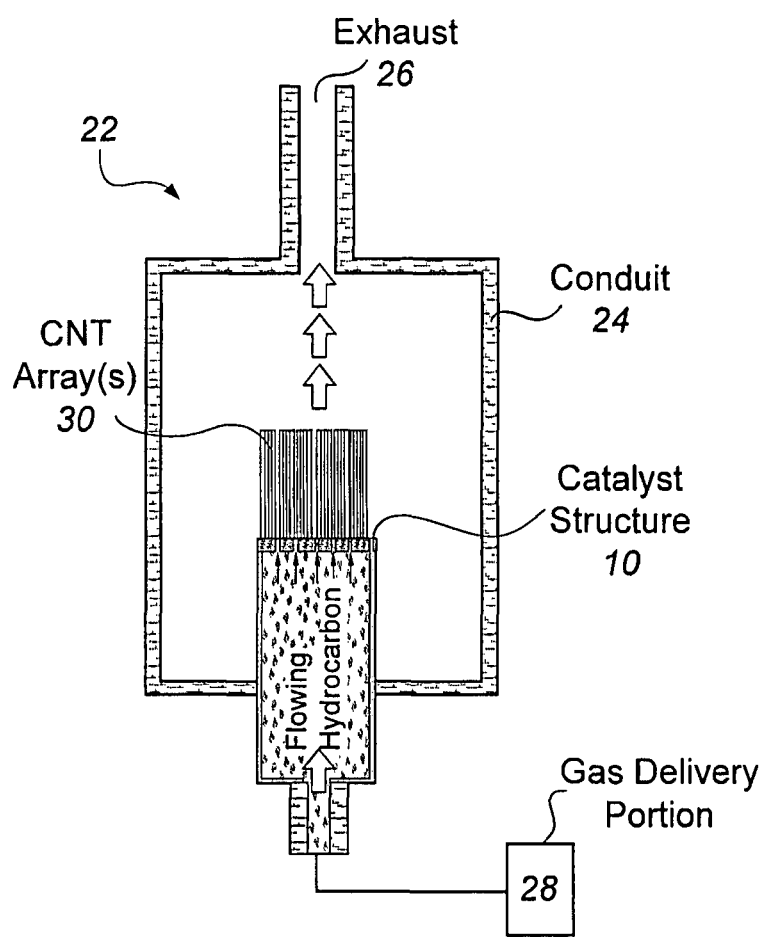
FIG. 3 shows an embodiment growth of CNTs using a catalyst structure having channels that permit the flow of a gaseous mixture of hydrocarbon and inert gas from one side of the catalyst structure to the other.

An embodiment system 22 of the invention is shown in FIG. 3. System 22 includes the channeled substrate 10 and conduit 24 large enough to surround channeled substrate 10. Conduit 24 is configured such that gas flowing through the conduit reaches the side of the structure opposite the catalyst before contacting the catalyst. Gas exits conduit 24 through exhaust 26. System 22 also includes gas delivery portion 28 that sends said gaseous carbon source through conduit 24 to catalyst structure 10. System 22, which includes the catalyst structure 10 in combination with gas delivery portion 24, allows CNT array(s) 30 to grow tall and to grow rapidly.

A catalyst structure useful for preparing a high purity, well-aligned array of multi-walled, long CNTs is prepared using a silicon substrate with channels therein, depositing a layer of aluminum oxide on the substrate, and depositing iron on the aluminum oxide layer. An array of long CNTs is prepared by exposing the catalyst to a gaseous mixture of carbon source and inert gas. In some embodiments, water vapor may be added to the gaseous mixture.

Buffer materials useful with this invention include, but are not limited to, aluminum oxide ($Al_2O_3$) and magnesium oxide (MgO).

Catalysts useful with the invention include metals such as, but not limited to, Fe, Co, Ni, mixtures of these metals, and alloys such as, but not limited to, Co—Mo or Fe—Mo.

In an embodiment, a catalyst structure is prepared using a silicon support having a thin surface layer of silicon dioxide ($SiO_2$), and channels in the silicon support, as shown in FIG. 1. First, a layer of aluminum oxide ($Al_2O_3$) of a thickness of from about 2 nm to about 20 nm, typically a layer having a thickness of about 10 nm, is deposited on the silicon dioxide, preferably by ion beam assisted deposition (IBAD). Although the layer of aluminum oxide could also be prepared using other techniques, such as but not limited to electron beam evaporation, the IBAD technique can deposit an $Al_2O_3$ layer that is fully, or at least partially amorphous. After the IBAD deposition, a thin layer (of about 1-3 nm in thickness) of iron is magnetron sputter-deposited onto the aluminum oxide layer. Without wishing to be bound by any particular explanation, it is believed that the aluminum oxide layer in some way improves catalytic activity and extends the lifetime of the catalyst. A catalyst used for preparing CNT arrays may have a 1 nm thick Fe layer, a 10 nm thick aluminum oxide layer, and 100 nanometer thick silicon dioxide layer on a silicon substrate. In another embodiment, the iron layer is changed to Fe particles. The aluminum oxide layer is deposited on the silicon dioxide layer by ion beam assisted deposition (IBAD), and the Fe layer is magnetron sputter deposited on the aluminum oxide layer. In yet another embodiment, a catalyst structure used for preparing CNT arrays has a 1 nm-thick Fe layer and an aluminum oxide layer having a thickness greater than about 20 nanometers on a silicon substrate. If the aluminum oxide layer is too thin (less than 10 nanometers), the Fe forms silicates with the substrate, which prevents growth of CNTs.

At least some of the catalyst particles that form on the buffer layer may include material from the buffer layer and from the silicon substrate. The buffer layer ($SiO_2$, for example) might be reduced to form a species (gaseous SiO, for example) that can react with catalyst particles. This reaction may take place even through the catalyst particles are not in direct contact with the substrate (a Si substrate, for example).

Some of the factors that may have an affect on the formation of catalyst particles include (i) the composition and thickness of the buffer layer, (ii) the composition and thickness of the catalyst film, and (iii) the temperature at which the catalyst is heated to form catalyst particles from the film. Without wishing to be bound by any particular explanation, a possible explanation for the formation of catalyst particles is that they form from the film during heating as a result of a reduction in interfacial and surface energy. The buffer material affects the interfacial energy, which in turn affects the size and shape of catalyst particles.

With regard to the thickness of the catalyst film, a thicker film tends to result in a structure with larger catalyst particles. Catalyst particles are less likely to form using a catalyst structure having too thin a catalyst film.

An optimum catalyst film thickness depends on the temperature and on the carbon source (hydrocarbon, alcohol, for example) used for synthesizing long CNTs.

The temperature used for converting a catalyst film into catalyst particles is typically the same or higher than the temperature used for nanotube production because the catalyst particles should be stable during the nanotube growth. The temperature for nanotube growth is largely determined by the carbon source and catalyst composition and size. These parameters tend to be interdependent.

CNT arrays of the invention can be prepared by chemical vapor deposition (CVD). In an embodiment, a catalyst structure is placed in a quartz tube furnace. The diameter of the furnace used will depend on the size of the catalyst used. For the sizes of catalyst described in certain embodiments of this invention, a furnace with a diameter of about one inch was used. After placing the catalyst in the furnace, the furnace is heated to an elevated temperature and a nonflammable gaseous mixture of argon and ethanol is sent through the tube furnace. Sometimes, water vapor is included in the gaseous mixture by passing a small amount of Ar gas through a water bubbler. The addition of water vapor can minimize the formation of amorphous carbon on the CNT array.

The growth rate for CNTs is affected by factors such as (i) particle size(s) of catalyst, (ii) catalyst environment (temperature, pressure, for example), (iii) effective delivery of gaseous carbon-source(s) to catalyst particles after the formation of a thick layer of nanotube array on the catalyst and substrate, (iv) avoiding the formation of amorphous carbon during the nanotube growth, and other factors.

The size of the catalyst particles may have an affect on the diameters of individual carbon nanotubes.

In some embodiments, catalyst particles with diameters in the range of about 1 nanometer to about 3 nanometers are uniformly distributed on a substrate. A catalyst particle density is chosen that results in a nanotube array rather than randomly oriented nanotubes.

The invention may employ a wide range of carbon sources. Alkanes hydrocarbons such as alkanes (methane and ethane, for example), alkenes (ethylene, for example), alkynes (acetylene, for example) and other gaseous sources may be used. Liquid sources such as hexane may also be used. Other carbon sources including, but not limited to, functionalized hydrocarbons (alcohols and ketones (acetone, ethanol, and the like) may be used. Also, a wide range of concentrations (from about 20 percent to about 80 percent of the carbon source and from about 20 percent to about 80 percent of an inert gas such as argon, helium, or an inert gas mixture) may be used. For the purposes of this invention, hydrocarbons also include functionalized hydrocarbons (acetone, ethanol, and the like). The percentage of a particular hydrocarbon used may depend to some extent on the hydrocarbon employed.

The invention also employs a wider temperature range for the is synthesis of an array of long nanotubes.

In an embodiment synthesis, an array of long CNTs is prepared on a structure having channels by placing the structure in a quartz furnace, adjusting the furnace temperature to a temperature of about 750 degrees Celsius, and sending a mixture of ethanol and forming gas through the furnace, where the forming gas was a mixture of about 94 percent argon and about 6 percent hydrogen. Forming gas is a gas mixture having argon and hydrogen. Forming gas typically has from about 90 percent to about 99 percent argon and from about 10 percent to about 1 percent hydrogen.

In another embodiment synthesis, a structure is placed in a quartz furnace, the furnace temperature is adjusted to a temperature of about 800 degrees Celsius, and a mixture of forming gas and ethanol is sent through the tube for a period of about 2 hours.

In another embodiment synthesis, a structure is placed in a quartz furnace, the furnace temperature was adjusted to a temperature of about 780 degrees Celsius, and a mixture of forming gas, ethanol, and water vapor is sent through a quartz tube over a catalyst structure. The addition of water vapor to the gaseous mixture might not have any substantial effect during the first part of the growth of the array, but may play a role in maintaining the activity (i.e. the growth rate) and the lifetime of the catalyst by minimizing the formation of amorphous carbon that contaminates the array and deactivates the catalyst. The formation of amorphous carbon has been a major cause of terminating nanotube growth. Once amorphous carbon forms and covers the catalyst particles, the catalysts will be deactivated and the nanotube growth will stop. This problem may be solved by, for example, introducing water vapor into the reaction chamber with the carbon source (hydrocarbon gas, for example). The formation of amorphous carbon is also minimized by using a carbon source, such as ethanol, that does not form or only minimally forms amorphous carbon when it decomposes. Ethanol is a preferred carbon source for the present invention. Other preferred carbon sources are methanol and isopropanol.

For a structure of the invention, the growth temperature duration, gaseous carbon nanotube precursor may be optimized for effective synthesis of arrays of long carbon nanotubes. Preferably, when ethanol is used as a carbon source gas, the processing temperature is in the range of from about 850 degrees Celsius to about 950 degrees Celsius. In an embodiment, ethanol is injected directly into the reaction chamber. By adjusting the injection rate, the partial pressure of ethanol may be controlled.

While not wishing to be bound by any particular explanation, it is currently believed that the longer it takes to grow an array of carbon nanotubes, the more amorphous carbon would be deposited on the CNT array. The presence of amorphous carbon on the array is detrimental for spinning fibers, and arrays with a substantial amount of amorphous carbon are unsuitable for spinning. A benefit of arrays prepared according to the present invention is that such arrays include only a minimal amount of amorphous carbon. This is likely due to the speed at which arrays may be grown using the invention. The longer CNT arrays synthesized herein enhance the strength of fibers spun from the arrays.

Certain important aspects of the present invention that have been described in some detail thus far have been concerned with preparing catalysts and using them to synthesize arrays of CNTs. Another aspect of the invention is concerned with using the arrays to make strong fibers of CNTs. CNT fibers can be continuously spun out of suitable CNT arrays like a thread spun from a silk cocoon. However, not all arrays are conducive to spinning. Currently, it may be that arrays with good alignment, high purity and therefore strong inter-tube interaction are favorable for spinning.

Figure 4:
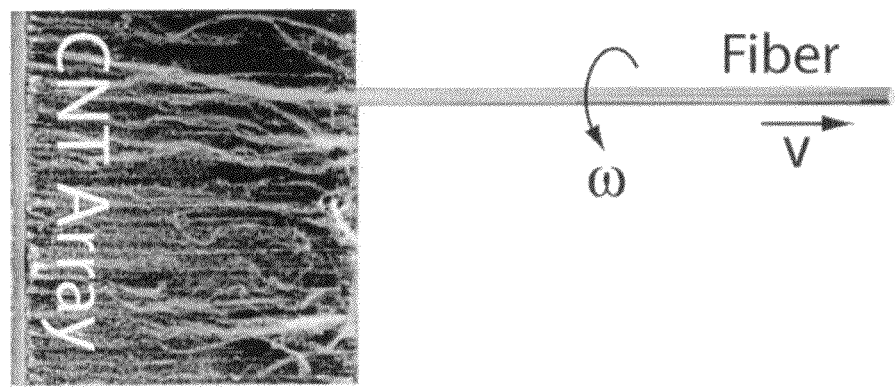
FIG. 4 shows a schematic representation of fiber spinning using an embodiment array of carbon nanotubes of the present invention.

FIG. 4 shows a schematic diagram relating to spinning a fiber from an array of long CNTs according to the present invention. As FIG. 4 shows, the fiber spins at a rate of $\omega$ while being pulled at a speed of v. The spinning parameters $\omega$ and v likely have an effect on the microstructural characteristics (e.g. the fiber diameter, the helix angle of individual CNTs in the fiber, and the like) of the resulting composite fiber. The spinning parameters can be adjusted to optimize the fiber structure for highest strength. FIG. 4 shows pulling CNTs from the array along the direction of growth of the CNTs. It should be understood that this pulling direction is only one embodiment, and that the CNTs could be pulled from the array at a different angle. The angle in FIG. 4 is 180 degrees. Thus, CNTs could be pulled from the array at an angle from about 90 degrees (normal to the direction of growth) to about 180 degrees (along the direction of growth).

A spinning shaft with an end configured for nanotubes to stick on (a hooked end, an end with adhesive, and the like) may be used for preparing a fiber from the CNT array. When this end of the spinning shaft makes contact with nanotubes from the supported array, the nanotubes begin to twist around the shaft. Many thousands of nanotubes are likely twisted together at the beginning. A fiber begins to grow as the array moves relative to the spinning shaft, and additional nanotubes from the array can twist around the growing fiber to extend the length of the fiber.

The as-spun fiber can be stretched to improve alignment of the nanotubes.

An advantage of spinning the fiber from the supported array is that the long nanotubes from the array are generally aligned relative to one another before they are spun into a fiber. The spinning process spirally aligns the nanotubes, and this spirally aligned arrangement provides the CNT (or CNT/polymer composite) fiber with high strength. CNT, or CNT/composite fibers of this invention have a rope like structure that is made strong by twisting the carbon nanotubes together and around each other.

CNT fibers spun from a CNT array of the invention display an enhanced mechanical strength. The enhancement of mechanical strength observed on fibers from the longer arrays may be because longer CNTs have a better interlocking ability during tensile testing and can therefore a carry higher load than fibers spun from shorter tubes.

The nanotubes of the array may be coated with a polymer solution before they are spun into fibers or during the spinning process. The spinning process spirally aligns the polymer-coated nanotubes, and when the nanotubes are carbon nanotubes, the resulting fiber has a high volume fraction (60 percent of nanotubes, and higher), and the twisting improves mechanical interlocking between nanotubes.

CNT fibers spun from the array can also be infiltrated/coated with a polymer matrix to form composite fibers.

The spinning approach has several advantages over a drawing approach. One advantage relates to the relative ease a spinning process provides for preparing fibers compared to a drawing process.

Another advantage of the spinning approach versus the drawing approach relates to the helical orientation of the nanotubes that results from spinning the nanotubes and twisting them around each other. This helical orientation contributes to improving load transfer because the twisted nanotubes can squeeze radially against each other when the composite fiber is under load, which increases the bonding strength and consequently load-transfer efficiency. Untwisted carbon nanotubes/polymer composite fibers prepared by drawing are not strong fibers, presumably because the nanotube-polymer interface is slippery, making it difficult to transfer load onto the nanotubes.

Another advantage of the spinning process of this invention is that the twisting squeezes out excess polymer so that individual CNTs can be closely spaced together. This close spacing increases the CNT volume fraction of the composite fiber.

Another advantage of the invention relates to using a substantially aligned array of carbon nanotubes to prepare a composite fiber. The alignment of the nanotubes prior to spinning guarantees alignment in the spun composite fiber.

Composite fibers prepared using nanotube arrays of the invention may be used for a variety of applications. These fibers could be used to prepare superior laminates, woven textiles, and other structural fiber composite articles. Fiber composites of this invention could be used to prepare strong and light armor for aircraft, missiles, space stations, space shuttles, and other high strength articles. The reduced weight would allow aircraft and projectiles to fly faster and for longer distances. These features are also important for spacecraft for future space missions (to the moon and to Mars, for example), where high strength and lightweight features of the composite fibers are very important.

Another advantage of this invention becomes apparent when metallic carbon nanotubes are used to prepare the composite fiber. Usually a fraction of carbon nanotubes in an array is metallic. Metallic carbon nanotubes have been shown to be highly electrically conductive. Thus, composite fibers of this invention prepared using precursor carbon nanotubes would not only be very strong but also highly electrically conductive.

Composite fibers of this invention are prepared using a substantially parallel, aligned carbon nanotube array. In some embodiments of the invention, arrays prepared using a channeled substrate of the invention may can be coated with a dilute solution of polymer by, for example, immersing the nanotube array in a polymer solution, and then ultrasonically vibrating the immersed array to promote wetting. Examples of polymer solutions that can be used to prepare carbon nanotube-polymer composites include, but are not limited to, polystyrene dissolved in toluene, low viscosity liquid epoxy, poly(methyl methacrylate) (PMMA) dissolved in PMF, polyvinyl alcohol (PVA) in water, and poly(vinyl pyrrolidone) (PVP) in water.

For the case involving polymer-coated nanotubes, after spinning and stretching, solvent is evaporated and the polymer is cured at an appropriate temperature. Detailed treatment parameters depend on the specific polymer and solvent that are used during the preparation. A vacuum oven may be used for solvent removal and curing.

The cured composite fiber of the invention can be evaluated in tension to obtain the strength, the dependency of the strength on the length (i.e. size effect), the Young's modulus, the ductility, and other properties. The fracture surface of the composite fiber may be examined using Scanning Electron Microscopy (SEM) to investigate the failure mode in order to evaluate the strength of the CNT/polymer interface. Transmission electron microscopy (TEM) may be used to examine individual CNT arrangements in the composite fiber and the CNT/matrix interface.

In summary, the invention provides a catalyst structure, a system, and a method for efficiently synthesizing carbon nanotube arrays of long carbon nanotubes (1-30 mm in length) using chemical vapor deposition, and preparing high-strength, lightweight fibers from the arrays. Channels in the structure allow for the flow of gaseous carbon source through the composite structure to the catalyst.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A structure, comprising:
    a substrate comprising silicon, the substrate having a first side having a layer of silica and a second side;
    a buffer layer on said layer of silica of said substrate;
    a catalyst on said buffer layer; and
    a plurality of channels extending through both said substrate and said buffer layer that allow a gaseous carbon source to enter the substrate at the second side and flow through the channels to said catalyst on said buffer layer on the first side of said substrate, said channels defining a diameter in the range of from about 0.5 millimeters to about 1 millimeter, and said channels having a separation of about 2 to about 4 millimeters.

2. The structure of claim 1, wherein said buffer layer comprises aluminum oxide or magnesium oxide.

3. The structure of claim 1, wherein said catalyst comprises metal catalyst particles chosen from iron, cobalt, nickel, molybdenum, mixtures thereof, and alloys thereof.

4. A system for preparing an array of carbon nanotubes, comprising:
    a structure, comprising a substrate comprising silicon, the substrate having a first side having a layer of silica and a second side;
    a buffer layer on said layer of silica of said substrate;
    a catalyst on said buffer layer; and
    a plurality of channels extending through both said substrate and said buffer layer that allow a gaseous carbon source to enter the substrate at the second side and flow through the channels to the catalyst, said channels defining a diameter in the range of from about 0.5 millimeters to about 1 millimeter, and said channels having a separation of about 2 to about 4 millimeters; and
    a conduit large enough to surround said structure and configured such that the gaseous carbon source flowing through said conduit contacts said second side of said structure before the gaseous carbon source contacts said catalyst; and
    a delivery system that sends said gaseous carbon source through said conduit to said structure.

5. The system of claim 4, wherein said buffer layer comprises aluminum oxide or magnesium oxide.

6. The system of claim 4, wherein said catalyst comprises metal particles chosen from iron, cobalt, nickel, molybdenum, mixtures thereof, and alloys thereof.

7. A method for preparing an array of carbon nanotubes, comprising:
    exposing a structure to a gaseous carbon nanotube precursor for a duration within a temperature range chosen to minimize the formation of amorphous carbon, wherein the structure comprises:
        a substrate comprising silicon, the substrate having a first side having a layer of silica and a second side, a buffer layer on the layer of silica on the substrate, a catalyst on the buffer layer, and channels extending through the substrate and buffer layer so as to permit the flow of the gaseous carbon nanotube precursor through the channels so as to contact the catalyst, said channels defining a diameter in the range of from about 0.5 millimeters to about 1 millimeter, and said channels having a separation of about 2 to about 4 millimeters, whereby an array of substantially aligned carbon nanotubes having an average length of greater than 0.5 millimeters forms on the structure.

8. The method of claim 7, wherein the buffer layer comprises aluminum oxide or magnesium oxide.

9. The method of claim 7, wherein said catalyst comprises metal particles chosen from iron, cobalt, nickel, molybdenum, mixtures thereof, or alloys thereof.

10. The method of claim 7, wherein the gaseous carbon nanotube precursor is chosen from hydrocarbons, alcohols, ketones, and mixtures thereof.

11. The method of claim 7, wherein gaseous carbon nanotube precursor comprises ethanol, ethylene, acetylene, hexane, or mixtures thereof.

12. The method of claim 7, wherein gaseous carbon nanotube precursor comprises forming gas.

13. The method of claim 7, wherein the gaseous carbon nanotube precursor comprises inert gas.

14. The method of claim 7, wherein the gaseous carbon nanotube precursor further comprises water vapor.

15. The structure of claim 1, further comprising an array of substantially aligned carbon nanotubes having an average length of greater than 0.5 millimeter, the array of substantially aligned carbon nanotubes being disposed atop the structure.

16. The structure of claim 1, wherein the buffer layer defines a thickness in the range of from about 2 nanometers to about 20 nanometers.

17. The structure of claim 1, wherein said channels define a diameter in the range of from about 0.5 millimeters to about 1 millimeter, and said channels have a separation of about 3 to about 4 millimeters.

18. The system of claim 4, wherein said channels define a diameter in the range of from about 0.5 millimeters to about 1 millimeter, and said channels have a separation of about 3 to about 4 millimeters.

19. The method of claim 7, wherein said channels define a diameter in the range of from about 0.5 millimeters to about 1 millimeter, and said channels have a separation of about 3 to about 4 millimeters.

* * * * *